Patented Dec. 18, 1934

1,985,002

UNITED STATES PATENT OFFICE 1,985,002

MANUFACTURE OF RUBBER ARTICLES

Douglas Frank Twiss and Edward Arthur Murphy, Wylde Green, and Alfred Niven, Erdington, England, assignors to Dunlop Rubber Company Limited, London, England, a corporation of Great Britain No Drawing. Application July 29, 1932, Serial No. 626,216. In Great Britain August 7, 1931

2 Claims. (Cl. 91—68)

This invention concerns improvements in or relating to the manufacture of goods of or containing rubber or similar material and is an improvement in or modification of the method described and claimed in Patent No. 1,953,972, April 10, 1934, filed February 5, 1931, referred to as the main patent.

The object of the invention is to produce articles of or containing rubber or similar material with a surface finish ranging from a smooth matt to a coarse granular texture as desired.

In the specification of the main patent we have described and claimed a method for the production of articles of or containing rubber or similar material provided with a surface finish ranging from a smooth matt to a coarse granular texture as desired, wherein the aqueous dispersions of the kinds therein specified are converted into granular dispersions in the manner therein described, and thereafter coating the articles to be provided with the surface finish with the granular dispersions and subsequently drying the coating thereon.

The granular dispersions of compounded, homogeneous, finely divided compositions of rubber or similar material are obtained according to the main patent by effecting the coagulation of the aqueous dispersions aforesaid during stirring or agitation thereof by precipitation in situ of one or more compounding ingredients by the inter-action or double decomposition of one or more water-soluble reagents having normally no coagulating effect upon the aforesaid dispersions with one or more water-soluble reagents, an ion of which may incidentally possess coagulating influences, subsequently added thereto, whereupon the aforesaid dispersions are transformed into granular dispersions comprising comparatively large aggregates of or containing rubber or the like particles distributed homogeneously throughout the aqueous medium as a precipitate of controlled degree of fineness.

Examples of the water-soluble reagents of the first class having normally no coagulating effect upon the dispersions are carbonates, sulphates, or silicates of the alkali metals or of ammonium.

Examples of the water-soluble reagents of the second class which inter-act with the water-soluble reagents of the first class to produce insoluble compounding ingredients are soluble salts of magnesium, aluminum, calcium, barium or zinc; sodium silicate also falls into this class if the corresponding reagent in the first class is such as to precipitate silicic acid, for example, ammonium carbonate.

It is often, however, undesirable to give, for instance, rubber articles made from a substantially uncompounded rubber mixing a surface coating with a compounded rubber or the like precipitate as described and claimed in our main patent. It is, therefore, advantageous to be able to make and employ in this connection, granular precipitates containing only a small amount of compounding ingredients, or even none at all.

According to the present invention, the improvement in or modification of method for the production of articles of or containing rubber or similar material provided with a surface finish ranging from a smooth matt to a coarse, granular texture as desired, as set forth in the main patent, comprises converting aqueous dispersions of the kinds hereinafter specified into granular precipitates in any of the manners hereinafter described, and thereafter coating by, for example, dipping, spreading or spraying the articles to be provided with the surface finish with the aforesaid granular precipitates, and subsequently drying the coatings thereon.

It has been known for some time that instead of the usual coherent type of coagulant, it is possible to obtain rubber as a flocculent precipitate from latex by the use of certain coagulants and by adjustment of the concentration of the latex; see for instance, "Estate Rubber" O. deVries, page 143, 1920.

It has now been found that the flocculent or granular precipitates of rubber can be prepared from rubber latex in a controllable manner, and that such precipitated rubber can be used for the production of articles of or containing rubber or similar material provided with a surface finish ranging from a smooth matt to a coarse, granular texture as desired.

The aforesaid flocculent or granular precipitates can be prepared from rubber latex in controllable manner by the use of a variety of coagulating agents and method of coagulation, provided that the coagulation is effected in the presence of a relatively large quantity of water and with or without the presence of a certain amount of colloidal substance found to have a restraining effect upon the coagulation.

Examples of suitable coagulants are acetic acid, sodium silicofluoride, aluminum chloride, potash alum, barium chloride, zinc acetate, zinc sulphate, magnesium acetate, magnesium sulphate, ferrous sulphate, ferric sulphate, nitric acid, hydrochloric acid and sulphuric acid.

Examples of substances having a restraining effect on the coagulation are casein, glue and gum acacia, sodium aluminate. The amount of such substances used also influences the degree of subdivision of the granular dispersion. The degree of concentration has also an influence on the fineness of the precipitate. In general, the lower the concentration, the finer the precipitate.

The aqueous dispersions aforesaid are preferably employed at such dilutions that 100 ccs. thereof contain not more than 10% of total solids.

By the suitable choice of reagents and conditions of working, granular dispersions of varying consistency can be formed.

If desired, the granular precipitates can be washed free from soluble reaction products such as soluble sulphates or chlorides by known means, as for instance, by filtration and washing prior to their consolidation.

The emulsions or dispersions of rubber or the like comprise those consisting of rubber, guttapercha, balata, or similar vegetable resins occurring naturally or artifically obtained. Such artificial aqueous dispersions may include those of coagulated rubber, vulcanized rubber, synthetic rubber, waste or reclaim.

If desired, any of the aforementioned dispersions may be used alone or in admixture with one another.

Any of the aforesaid dispersions may contain the usual known compounding ingredients in relatively small proportions and vulcanizing ingredients and/or may be in the first instance in concentrated form.

Concentrates such as are obtained in Patent 1,846,164 to which may be added any one or more of the usual known compounding ingredients, may also be employed subsequent to dilution.

The aforesaid vulcanizing and/or compounding ingredients, which are added in the form of their dispersions, may be added to the aforesaid aqueous emulsions or dispersions of rubber or the like, prior or subsequent to the formation of the granular or flucculent precipitate.

The following are given by way of example showing how the granular precipitates can be obtained. In every case the rubber latex is first diluted so that 100 ccs. thereof contain 4% of total solids. The latex employed can be natural latex or concentrated latex, concentrated preferably by centrifugalization.

Example I

Sodium silicofluoride gives granular precipitates with diluted latex.

The addition of 0.8 cc. of a 5% solution of casein while stirring, to 100 cc. of diluted natural latex, and of 1 cc. of a 20% dispersion of sodium silicofluoride leads to the production of a granular rubber precipitate.

Similarly, the addition, while stirring, of 4 cc. of a 5% solution of glue or gum acacia to 100 cc. of diluted natural latex and the subsequent addition of 0.5 cc. of a 20% dispersion of sodium silicofluoride, leads to the production of a granular rubber dispersion.

The addition of 0.8 cc. of a 5% solution of casein, while stirring, to 100 cc. of diluted concentrated latex produced by centrifugalization with the subsequent addition of 1 cc. of a 20% dispersion of sodium silicofluoride during the stirring, also leads to the production of granular rubber precipitates.

A granular rubber precipitate can also be produced if to 100 ccs. of diluted rubber latex, 4 cc. of a 5% solution of glue or gum acacia is added, while stirring, with the subsequent addition of 0.4 cc. of 20% dispersion of sodium silicofluoride.

Example II

Diluted latex can be made to give granular precipitates by the use of metallic salts such as aluminum chloride, potash alum, barium chloride, calcium chloride, zinc acetate, zinc sulphate, magnesium acetate, magnesium sulphate, ferrous sulphate, ferric sulphate.

Granular rubber precipitates can be produced from 100 cc. of diluted latex to which 4 cc. of a 5% solution of aluminum chloride has been added while the mixture is being stirred.

The addition of 1 cc. of a 5% solution of aluminum chloride, while stirring, to 100 cc. of diluted latex, also leads to the production of granular rubber precipitates.

Granular rubber precipitates can be produced by adding 12 cc. of a 5% solution of barium chloride, while stirring, to 100 cc. of diluted natural latex to which previously has been added 4 cc. of a 5% solution of casein.

Granular precipitates of rubber can also be produced from diluted latex if to 100 cc. of this diluted latex, 2.4 cc. of a 5% solution of casein is added while stirring, and thereafter 7.2 cc. of a 5% solution of barium chloride. If desired, the latex employed can be of very low ammonia content. This has been found to be particularly desirable when used with zinc sulphate or magnesium acetate.

Example III

Mineral acids, such as hydrochloric, nitric and sulphuric acid can also yield granular precipitates with diluted latex as, for instance, to 100 cc. of diluted natural latex, add 3.2 cc. of a 5% solution of casein and then 1 cc. of a 10% solution of sulphuric acid. The mixture is well stirred, when a granular precipitate is readily formed.

What we claim is:

1. A method for forming on rubber articles a surface finish ranging from a smooth matte to a coarse granular texture which comprises coagulating aqueous dispersions of rubber of a controlled concentration of less than about 10% solid content into granular precipitates of substantially uncompounded dispersed rubber without added materials, and thereafter coating the articles to be provided with the surface finish with the aforesaid granular precipitate, and subsequently drying the coating thereon.

2. A method for the production of articles of rubber having a selected surface finish in a range from a smooth matte to a coarse granular texture which comprises coagulating rubber latex of substantially the composition of the article to be surfaced and of a concentration less than 10% of solid content at a rate co-ordinated with its dilution to obtain a precipitate of predetermined size, and thereafter coating the surface of the article with said precipitate.

DOUGLAS FRANK TWISS.
EDWARD ARTHUR MURPHY.
ALFRED NIVEN.